United States Patent [19]
Knight, Jr.

[11] 3,914,956
[45] Oct. 28, 1975

[54] SOFT ICE CREAM DISPENSER
[75] Inventor: Philip A. Knight, Jr., Concord, Mass.
[73] Assignee: Raytheon Company, Lexington, Mass.
[22] Filed: Jan. 28, 1974
[21] Appl. No.: 438,155

[52] U.S. Cl. .............. 62/343; 62/457; 259/DIG. 34
[51] Int. Cl.² .......................................... A23G 9/00
[58] Field of Search ..................... 62/342, 343, 457; 259/DIG. 32, DIG. 34, 43, 44

[56] References Cited
UNITED STATES PATENTS

| | | | |
|---|---|---|---|
| 814,993 | 3/1906 | Thompson | 259/DIG. 34 |
| 911,348 | 2/1909 | Viedt | 259/DIG. 34 |
| 936,060 | 10/1909 | Viedt | 259/DIG. 34 |
| 990,497 | 4/1911 | Pfouts | 259/DIG. 34 |
| 1,081,790 | 12/1913 | Thompson | 259/DIG. 34 |
| 1,533,708 | 4/1925 | Pfouts | 259/DIG. 34 |
| 2,557,813 | 6/1951 | Burton | 259/DIG. 34 |
| 2,599,021 | 6/1952 | Sebastian | 259/DIG. 34 |
| 3,780,536 | 12/1973 | Fishman et al. | 259/DIG. 34 |

Primary Examiner—William F. O'Dea
Assistant Examiner—Peter D. Ferguson
Attorney, Agent, or Firm—Harold A. Murphy; Joseph D. Pannone; John T. Meaney

[57] ABSTRACT

A soft ice cream dispenser particularly adapted for home use comprising a mixing chamber and an enclosing container or bucket having an outlet channel which communicates with the interior of the mixing chamber, the mixing chamber containing a rotatable dasher which includes angled blades which, upon rotation of the dasher, provide an auger affect upon ice cream in the chamber, tending to force the ice cream downwardly and out the channel.

1 Claim, 4 Drawing Figures

SOFT ICE CREAM DISPENSER

BACKGROUND OF THE INVENTION

Ice cream making appliances for use in the home commonly embody a mixing chamber containing the ice cream mix to be frozen, and an outer enclosing container or bucket. A suitable refrigerated material is usually located in the space between the chamber and the bucket for cooling the mix while the mix is being agitated by a dasher. Eventually, the mix will be cooled to such an extent that it will become considerably thickened whereupon the dasher is removed and the mix allowed to harden in the chamber.

In an improved device, the refrigerant is a frozen eutectic solution which is contained within the sealed walls of a hollow-walled mixing chamber. This solution is frozen prior to the ice cream making procedure, and the ice cream mix is thereafter placed in the container whereby heat is removed from the mix through the inner wall of the container. This type of ice cream making is fully described in copending patent application Ser. No. 352,761, filed Apr. 19, 1973, now abandoned by William H. Hapgood and assigned to the same assignee as the present invention.

In many known ice cream making devices designed for home use, it is the practice to freeze the ice cream to the usual consistency of normal "hard" ice cream, whereupon the ice cream may be scooped, spooned or similarly removed from the container or bucket. In the event that the ice cream were to be removed in "soft" form, that is, at the time the dasher is removed and before final solidifying of the cooled and thickened mix, it is still necessary to scoop or spoon the mixture from the container, with little likelihood that it could be "poured" easily from the container because of its thickened consistency. Therefore, the use of the soft ice cream in ice cream cones and the like is very inconvenient.

SUMMARY OF THE INVENTION

The present invention is directed toward an ice cream maker which overcomes the foregoing objections and disadvantages of prior art ice cream makers by providing novel means for dispensing soft ice cream from the appliance in an efficient and convenient manner.

The container of the appliance of the present invention is provided with an open bottom so that the ice cream mix rests directly upon the bottom of the enclosing bucket and is confined from flowing laterally by the container sides, the annular end of the container being seated upon the flat bottom of the bucket for this purpose.

The bucket bottom is provided with an outlet opening which communicates with one end of a channel, the other end of the channel being open to the exterior at an outer side surface of the bucket. A slide is positioned to normally close the inner end of the channel and is shaped to extend through the side of the bucket so than an outer end may be grasped whereby it may be slid in a manner to open the channel to permit soft ice cream to escape from the container.

However, since even "soft" ice cream is usually too thick to flow by itself, means is provided to expel it from the container through the channel.

This means is embodied in the dasher which is provided with vertically and/or horizontally extending vanes or paddles which are angled so that when the dasher is rotated the soft ice cream will be urged toward the outlet opening.

BRIEF DESCRIPTION OF THE DRAWINGS

The above and other advantages of this invention will become apparent from the following description taken in connection with the accompanying drawings, wherein.

DESCRIPTION OF THE PREFERRED EMBODIMENT

Figure 1:
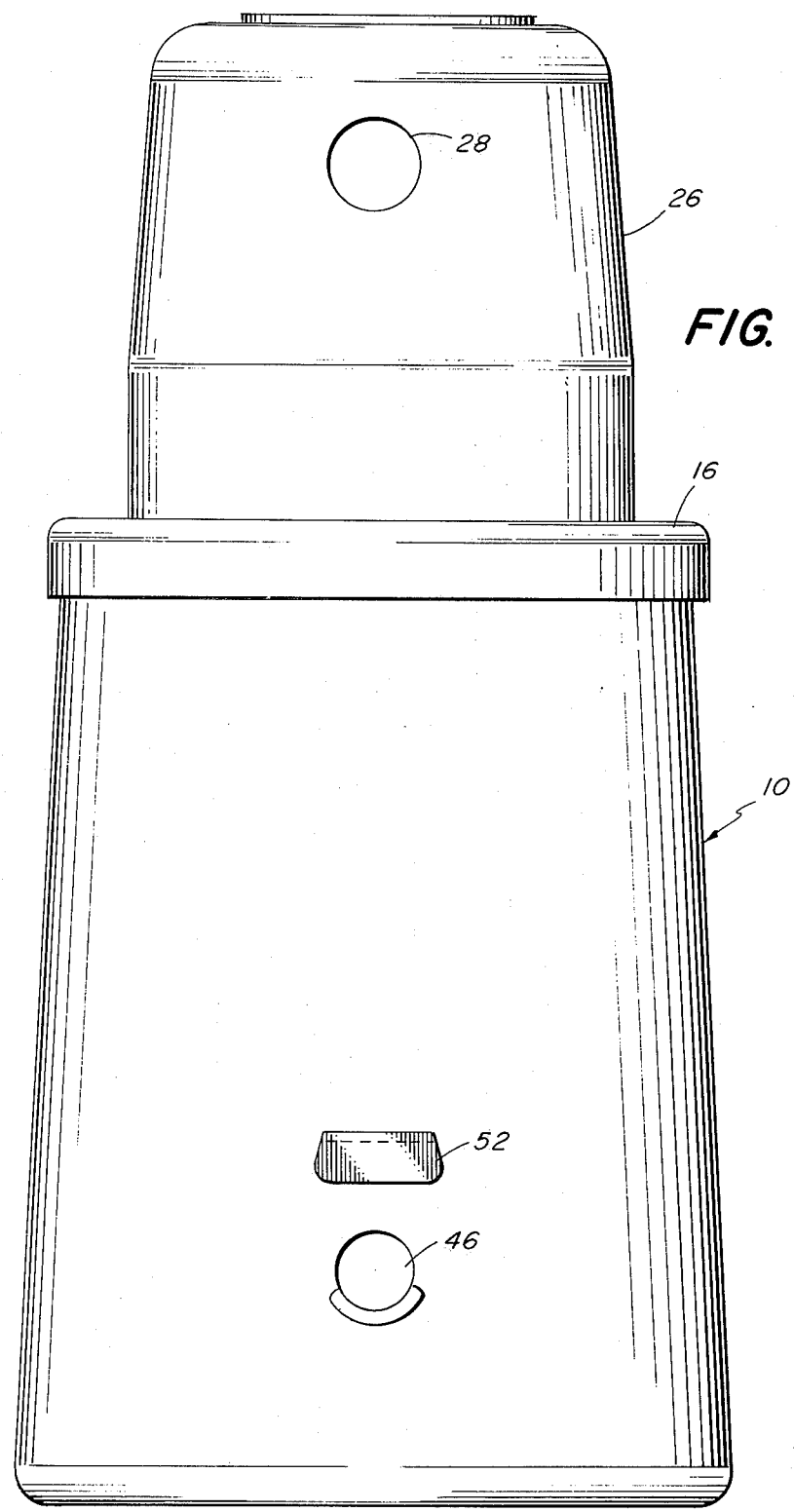
FIG. 1 is an elevational view of an ice cream maker embodying the invention.
Figure 2:
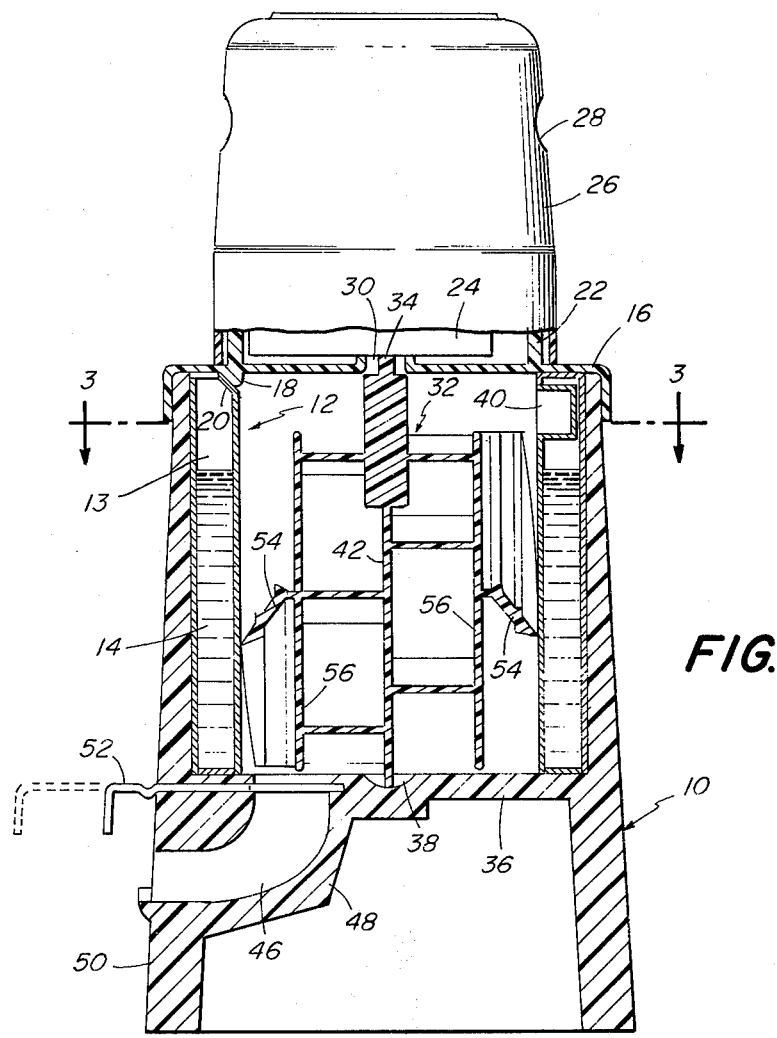
FIG. 2 is a vertical sectional view of the appliance of FIG. 1.
Figure 3:
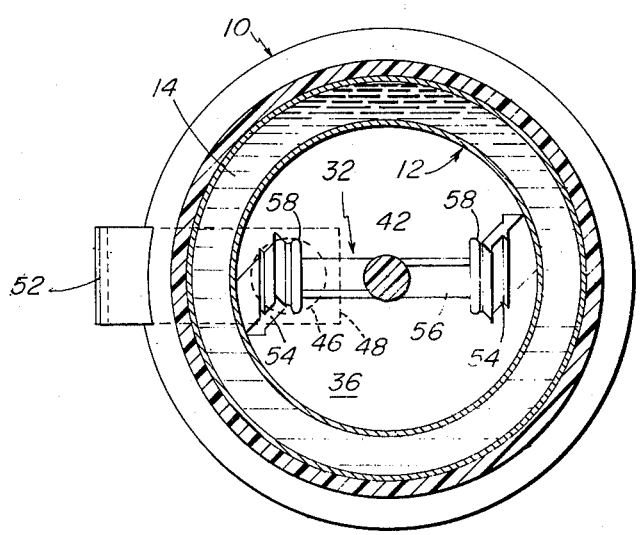
FIG. 3 is a transverse sectional view taken substantially on line 3—3 of FIG. 2 looking in the direction of the arrows.

Referring to FIGS. 1 and 2, there is shown an appliance which may be used to home freeze a product such as ice cream in accordance with the present invention. This appliance is motorized, as will be described, and may be made to handle any desired capacity such as one-half gallon, for example.

A freezer container or bucket 10 is preferably formed as an open-top hollow body of metal or high impact plastic. A freezer cylinder or mixing chamber 12 is a double walled metal cylinder open at both top and bottom and shaped to snugly but slidably interfit within the container 10. The sealed space 13 within the hollow walls of the cylinder 12 is partially filled with a eutectic freeze solution 14 to be described hereinafter.

A freezer cover 16 of metal or molded high impact plastic fits over the upper end of the container 10 and is provided on its under side with at least one projection 18 which interfits within a comating recess 20 provided in the upper inner peripheral edge of the container for preventing relative motion between the container and cover. Cover 16 is also provided with a number of upwardly directed projections 22 for attachment of the motor assembly including a motor 24. In actuality, the so-called motor assembly includes, in addition to motor 24, the covers 16 and 26.

The motor 24 may be provided with a suitable cord (not shown) by which it may be connected into an electrical circuit for operation in the normal manner. Mounted over the motor assembly is a housing 26 which is vented as at 28 so as to allow the motor 26 to be cooled.

The freezer cover 16 is provided with a central opening 30, and a dasher 32 is positioned within the cylinder 12. Dasher 32 has a drive bar or shaft 34 which projects upwardly through the opening 30 to be driven by motor 24. The dasher 32 may be of a type having paddles and vanes which agitate a product mix within the freeze cylinder 12 and scrape the inner walls thereof as the dasher is rotated. The dasher will be more fully described hereinafter.

In the process of freezing a product such as ice cream, the freeze cylinder 12 is removed from the bucket 10 and placed in a household freezer or freezer compartment of a refrigerator for a length of time suitable to freeze the eutectic solution. When the process of making ice cream is to be completed, the cylinder 12 is placed in the container 10 with its open bottom end firmly positioned on the base 36 of the container as shown in FIG. 2. The dasher 32 is placed in the cylinder with its lower end located for rotation within a suitable recess 38 in the surface of the container base 36.

The ice cream mix or other selected product mix is poured into the interior of the cylinder up to the filling point, which allows for expansion and aeration. Then the cover 16, motor assembly and housing 26 are placed in position. Heat from the mix will immediately start to be absorbed by the eutectic solution 14, and the mix will simultaneously be agitated by operation of the motor 24 and consequent rotation of the dasher 32. This process will be allowed to continue until the mix is partially frozen, at which time the dasher may be removed and the mix allowed to freeze to the desired consistency when conventional ice cream is to be made. In such a case, when the ice cream is suitably frozen, the motor assembly, housing 26, and cover 16 are removed allowing the cylinder 12 to be removed. Finger recesses 40 are provided in the upper inner surface of the cylinder above the level of the product therein for easy removal of the cylinder.

The freeze solution 14 is permanently contained in the sealed space 13 within the walls of the freeze cylinder 12. The freeze solution 14 is a eutectic which is specifically designed to provide the correct temperatures for the freezing of the product and to allow maximum absorption of heat at those temperatures without requiring any adjustment of the solution, as set forth in the aforementioned Hapgood application.

In accordance with this invention, the eutectic freeze solution 14 is frozen as by placing the cylinder 12 in a freezer overnight, for example. It is thereafter placed in the bucket 10 and filled with a liquid ice cream mix. The dasher 32 is then located in place in the mix with the lower end of its vertically extending center shaft 42 positioned upon the adjacent upper surface of the bucket bottom 36, preferably in the aligning recess 38 therein.

When the motor assembly, including covers 16 and 26, are in place the motor 24 is operatively connected with the drive bar 34 on the enlarged upper end portion of the dasher shaft 42. Upon operation of motor 24 in the usual manner, the dasher 32 will be rotated. When this has taken place for a suitable length of time the ice cream mix will be considerably thickened to the point where the dasher 32 may be removed and the mix allowed to solidify to the consistency of normal frozen ice cream.

However, at the time the dasher is removed, the mix has the density of "soft" ice cream which is often desirable for eating at this stage. As long as the dasher 32 is kept revolving the soft ice cream is maintained.

Therefore, in accordance with this invention, soft ice crem is removed while the dasher 32 is being rotated. This is done through the provision of an outlet channel 46 which is disposed in an enlarged portion 48 of the bucket bottom 36, as shown in FIG. 2.

The inner end of channel 46 communicates with the interior of the cylinder 12 and with the ice cream therein, and the outer end opens into the outer atmosphere from the side wall of the bucket base portion 50. A restrainer, which may take any suitable form such as a slide 52, is located in the bucket wall in a manner to be moved into and out of closing relation to the inner end portion of channel 46. Thus, when slide 52 is moved out to the position indicated by dotted lines, it will expose the channel 46 to the soft ice cream.

Normally, the soft ice cream will be too thick to flow by itself. Therefore, the dasher 32 is provided with vanes or paddles which are designed to force the ice cream downwardly within the cylinder 12 and through the channel 46. Ice cream forced through the channel in this way will emerge from the open end of the channel 46 where it may be deposited in a cone or dish.

To achieve such forceful expelling of the soft ice cream the dasher 32 may be provided with angled vertical paddles 54 or angled horizontal vanes 56, or both. Dasher 32 includes two diametrically opposed parallel vertical blades 58 spaced on opposite sides of shaft 42. Blades 58 are secured to adjacent sides of shaft 42 by a number of the radially extending vanes 56 which are fixed at one end to the shaft 42 and at the other end to the adjacent blade 58. Broad area surfaces of the vanes 56 are angled with respect to the axis of the shaft so that when the dasher is rotated the vanes will tend to urge the ice cream downwardly toward bucket bottom 36.

Figure 4:
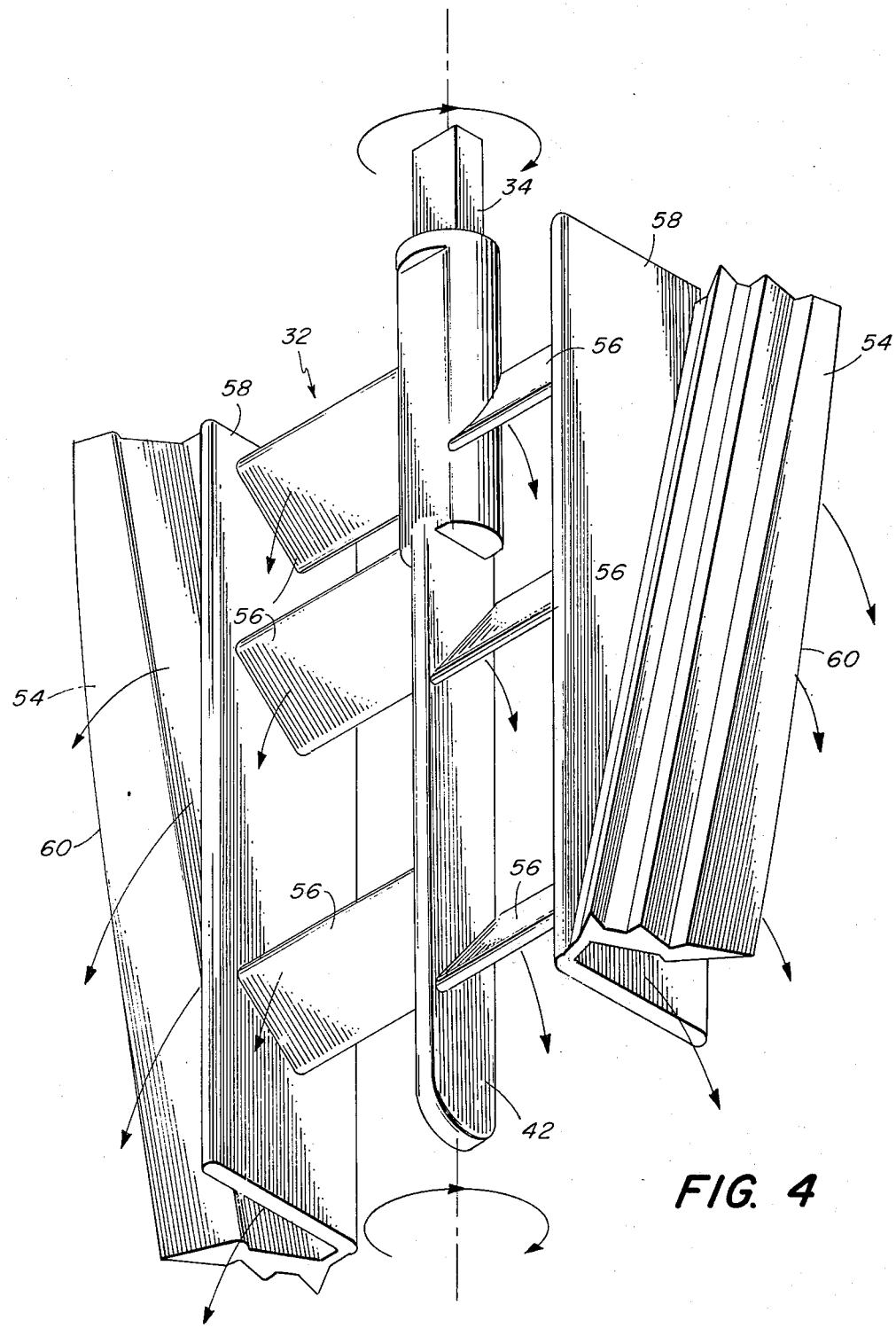
FIG. 4 is an enlarged isometric view of a dasher embodying the invention.

The vertically extending paddles 54 are each attached along one vertically extending edge to the outer surface of a respective blade 58, as shown in FIG. 4. Such attachment is made whereby the attached edges are positioned to extend vertically between opposite corners of the blades 58, thus angling the paddles 54. The opposite edges 60 of the paddles 54 are slightly curved to fit closely within or slightly spaced from the adjacent wall of the cylinder 12. Thus, when either or both the vertical paddles 54 and horizontal vanes 56 are angled as shown and described, rotation of the dasher 32 in the proper direction will forcibly urge the soft ice cream downwardly and out the channel 46. The outward flow of the ice cream may be terminated by closing the slide 52.

From the foregoing it will be apparent that the objectives of this invention have been achieved by the ice cream making appliance shown and described. It will be apparent, however, that various changes and modifications may be made in the invention shown and described by those skilled in the art without departing from the spirit of the invention as expressed in the accompanying claims. Therefore, all matter shown and described is to be interpreted as illustrative and not in a limiting sense.

I claim:

1. An ice cream maker comprising a bucket having sides and a closed bottom, a freeze cylinder within the bucket supported upon said closed bottom and having a wall spaced from said sides of the bucket whereby a freezing medium may be located therebetween and a dasher rotatably mounted in said cylinder for agitation of ice cream mix therein, said bottom of the bucket having a channel therethrough communicating between the interior of the cylinder and the exterior of the bucket, and movable means carried by said bucket for closing said channel, said dasher being provided with agitating elements which are shaped to urge mix within the cylinder downwardly when the dasher is rotated and comprising a central vertically extending shaft, a plurality of radially extending diametrically opposed vanes all having surfaces angled to urge the mixture downwardly when the dasher is rotated, and a pair of blades fixed to the outer ends of respective groups of vanes and extending parallel to the axis of the freeze cylinder, each of said blades having fixed thereto a respective paddle, said paddles each extending longitudinally within the cylinder and angularly with respect to the axis thereof and having an arcuate outer edge shaped to engage the wall of the cylinder throughout its length.

* * * * *